United States Patent
Wakefield

(10) Patent No.: US 7,230,585 B2
(45) Date of Patent: Jun. 12, 2007

(54) TWO-WAY DISPLAYS AND METHODS OF OPERATING THE SAME

(75) Inventor: Ivan Nelson Wakefield, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 591 days.

(21) Appl. No.: 10/281,668

(22) Filed: Oct. 28, 2002

(65) Prior Publication Data

US 2004/0080468 A1    Apr. 29, 2004

(51) Int. Cl.
*G09G 3/18*  (2006.01)

(52) U.S. Cl. ............... 345/55; 345/87; 345/156; 345/649; 345/659; 345/660

(58) Field of Classification Search ............. 345/87, 345/156, 649, 659, 660; 455/550, 566, 567, 455/575; 379/93.17; 709/200, 217; 340/286.01, 340/286.02
See application file for complete search history.

(56) References Cited

U.S. PATENT DOCUMENTS

| | | | |
|---|---|---|---|
| 5,896,575 A | 4/1999 | Higginbotham et al. | 455/566 |
| 6,144,358 A * | 11/2000 | Narayanaswamy et al. | 345/102 |
| 6,445,574 B1 * | 9/2002 | Saw et al. | 361/681 |
| 6,466,202 B1 | 10/2002 | Suso et al. | 345/169 |
| 6,492,974 B1 * | 12/2002 | Nobuchi et al. | 345/156 |
| 6,518,956 B1 * | 2/2003 | Sato | 345/173 |
| 6,567,101 B1 * | 5/2003 | Thomas | 345/649 |
| 6,628,971 B1 * | 9/2003 | Yoon et al. | 455/566 |
| 6,741,301 B2 * | 5/2004 | Tsuji | 349/58 |
| 6,792,293 B1 * | 9/2004 | Awan et al. | 455/566 |
| 6,839,101 B2 * | 1/2005 | Shima | 349/58 |
| 2001/0023194 A1 * | 9/2001 | Pettersson et al. | 455/566 |
| 2001/0049293 A1 * | 12/2001 | Shimazaki | 455/550 |
| 2004/0136155 A1 * | 7/2004 | Onishi et al. | 361/683 |
| 2005/0253773 A1 * | 11/2005 | Sekiguchi | 345/1.1 |

FOREIGN PATENT DOCUMENTS

| | | |
|---|---|---|
| EP | 0 881 617 | 12/1998 |
| GB | 2 349 784 | 11/2000 |
| GB | 2364462 | 1/2002 |
| GB | 2376616 | 12/2002 |

* cited by examiner

*Primary Examiner*—Richard Hjerpe
*Assistant Examiner*—Leonid Shapiro
(74) *Attorney, Agent, or Firm*—Myers Bigel Sibley & Sajovec PA

(57) ABSTRACT

Two-way displays include a transmissive display. A sensor detects an orientation of the transmissive display. A processor modifies a format of characters displayed on the transmissive display responsive to the orientation of the transmissive display. Mobile terminals including two-way displays and methods of operating the same are also provided.

19 Claims, 3 Drawing Sheets

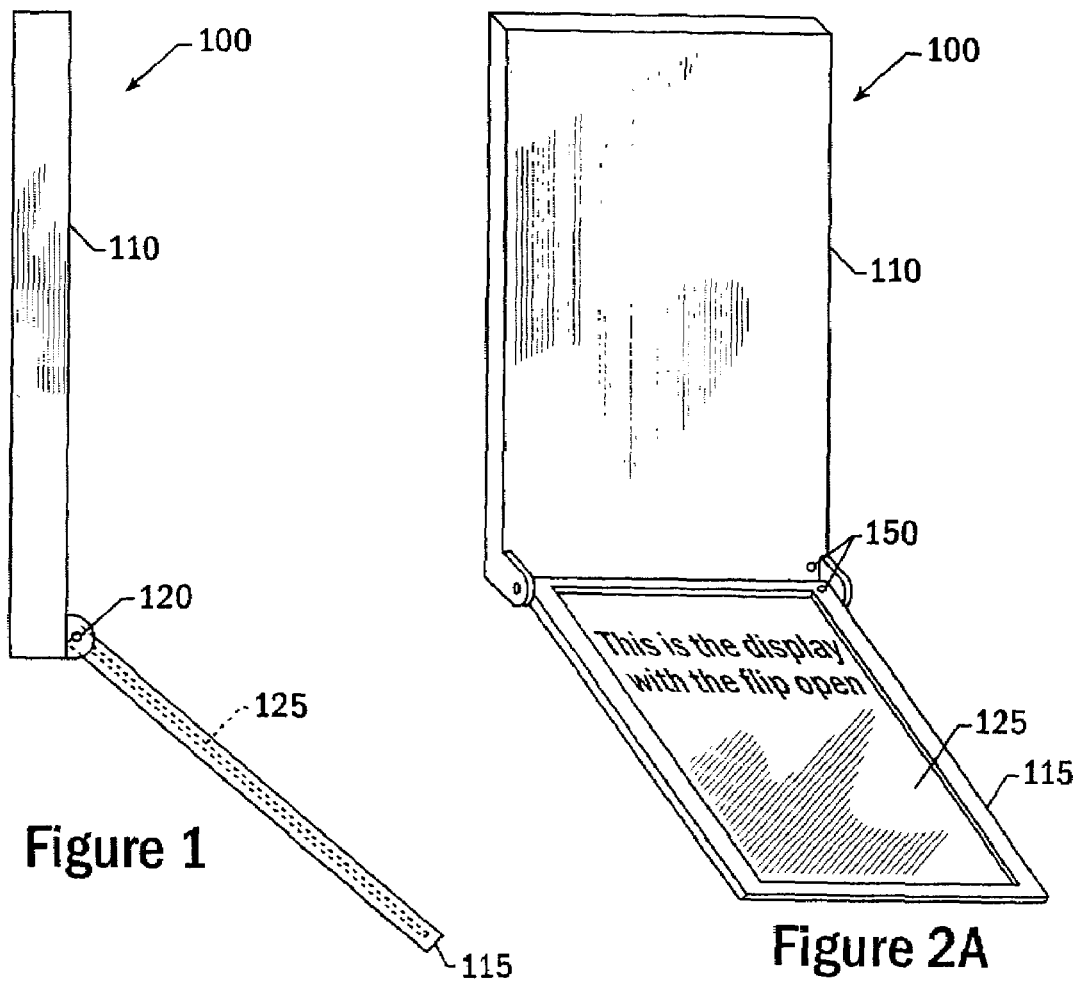
Figure 1
Figure 2A
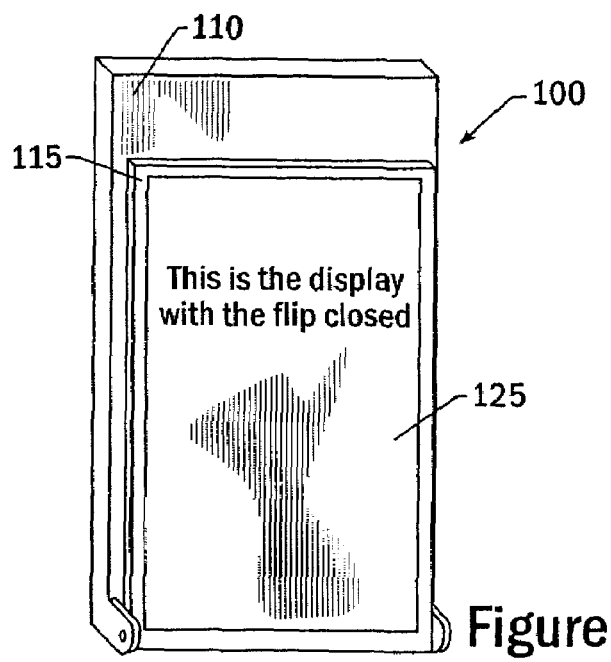
Figure 2B

TWO-WAY DISPLAYS AND METHODS OF OPERATING THE SAME

BACKGROUND OF THE INVENTION

The present invention relates to displays for electronic devices, such as radiotelephones and, more particularly, to two-way displays.

Manufacturers and designers of personal electronic devices, such as radiotelephones, frequently seek to reduce the overall dimensions of such devices while maintaining attractive style characteristics for the devices. One consequence of the reduced size for such devices is that less surface area may be available for a user display. Furthermore, many such devices include a flip to provide more surface area to the devices and/or for protection of the user interfaces of the devices. As a result, a dual display may be provided, one for when the flip is in an open position and a second for when the flip is closed. Alternatively, a single display may be positioned so that it is only partially blocked when the flip is closed.

SUMMARY OF THE INVENTION

Embodiments of the present invention provide two-way displays including a transmissive display. A sensor detects an orientation of the transmissive display. A processor modifies a format of characters displayed on the transmissive display responsive to the orientation of the transmissive display. The transmissive display may be a liquid crystal display and/or a light emitting diode (LED) display. The LED display may include a transmissive substrate on which the LEDs are mounted.

In further embodiments of the present invention, the transmissive display has a first orientation and a second orientation. The processor is configured to modify the format of characters displayed on the transmissive display by a rotation of about 180° about a first axis when the transmissive display moves between the first and second orientation. The processor may also be configured to modify the format of characters displayed on the transmissive display by a rotation of about 180° about a second axis, orthogonal to the first axis, when the transmissive display moves between the first and second orientation.

In other embodiments of the present invention, a protective window is on a front face of the transmissive display. A protective window may also be on a back face of the transmissive display. A reflector may be positioned adjacent the transmissive display in the first orientation and the display may be viewable in a reflective mode in the first orientation.

In further embodiments of the present invention, the transmissive display is a color display. The color display may be a single color display. The color display may alternatively include pixel elements of a plurality of different colors. In particular embodiments, the transmissive display includes three different colors of pixel elements and adjacent sets of pixels include each of the three different colors. In further embodiments, the color display includes one or more color filter(s) on a front side of the transmissive display to define a color of the transmissive display in the first orientation and one or more color filter(s) on a back side of the transmissive display to define a color of the transmissive display in the second orientation.

In other embodiments of the present invention, mobile terminals are provided including a portable housing. A flip member is rotatably connected to the portable housing. The flip member has a first orientation positioned adjacent the portable housing (closed) and a second orientation positioned away from the housing (open). A transmissive display is positioned in the flip member. A sensor detects the orientation of the flip member. A processor modifies a format of characters displayed on the transmissive display responsive to the orientation of the flip member. The transmissive display may be a liquid crystal display and/or a light emitting diode (LED) display mounted on a transmissive substrate.

In further embodiments of the present invention the mobile terminal includes a protective window on a front face of the transmissive display. A protective window may also be provided on a back face of the transmissive display. A reflector may be positioned between the transmissive display and the portable housing in the first orientation and the transmissive display may be viewable in a reflective mode in the first orientation. The transmissive display may be a color display including one or more color filter(s) on an outer side of the transmissive display relative to the portable housing to define a color of the transmissive display in the first orientation and one or more color filter(s) on an opposite inner side of the transmissive display to define a color of the transmissive display in the second orientation. In particular embodiments, the mobile terminal is a radiotelephone that includes a communication circuit positioned in the portable housing.

In other embodiments of the present invention, methods are provided for operating a two-way display. An orientation of a transmissive display is detected. A format of characters displayed on the transmissive display is modified responsive to the orientation of the transmissive display. The transmissive display may be a liquid crystal display and/or a light emitting diode (LED) display mounted on a transmissive substrate. The transmissive display may have a first orientation and a second orientation and modifying the format of the characters may include rotating the characters about 180° about a first axis when the transmissive display moves between the first and second orientation. Modifying the format of the characters may further include rotating the characters about 180° about a second axis, orthogonal to the first axis, when the transmissive display moves between the first and second orientation.

BRIEF DESCRIPTION OF THE DRAWINGS

FIG. 1 is a schematic side view illustrating a mobile terminal according to embodiments of the present invention;

FIG. 2A is a schematic illustration of the mobile terminal of FIG. 1 with the flip member in an open position according to embodiments of the present invention;

FIG. 2B is a schematic illustration of the mobile terminal of FIG. 1 with flip member in a closed position according to embodiments of the present invention;

DETAILED DESCRIPTION

Figure 3:
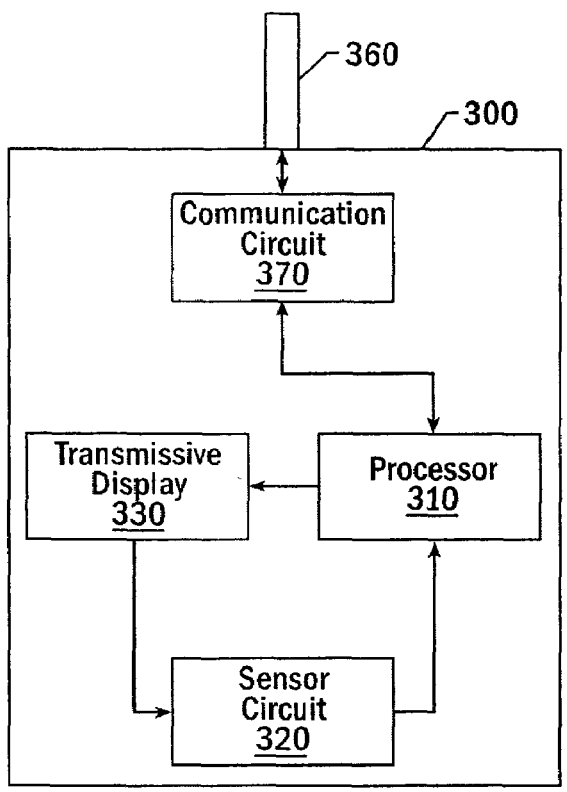
FIG. 3 is a schematic block diagram illustrating a mobile terminal according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention is described below with reference to flowchart illustrations and/or block and/or flow diagrams of methods and mobile terminals or micro-speaker assemblies according to embodiments of the invention. It will be understood that each block of the flowchart illustrations related to methods, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block and/or flow diagram block or blocks.

Embodiments of the present invention will now be described with reference to the schematic side view illustration of a personal electronic device, in particular, a wireless mobile terminal, in FIG. 1. FIG. 1 illustrates an exemplary mobile terminal that may be used with a wireless communications network. The mobile terminal 100 includes a portable housing 110 and a flip member 115 rotatably connected to the portable housing 110 by a hinge 120. A transmissive display 125 is positioned in the flip member 115.

The mobile terminal 100 is illustrated in a simplified form in FIGS. 1, 2A and 2B to facilitate understanding of the present invention. However, it is to be understood that the mobile terminal 100 may include various other features such as a keyboard/keypad, a microphone, a communication circuit 370 (FIG. 3), that may include a transceiver, and a memory, that communicate with a controller/processor 310 (FIG. 3). The transceiver typically includes both a transmitter circuit and a receiver circuit, which respectively transmit outgoing radio frequency signals to a base station transceiver of the wireless communications network and receive incoming radio frequency signals, such as voice signals, from the base station transceiver. The radio frequency signals transmitted between the mobile terminal and the base station transceiver may comprise both traffic and control signals (e.g., paging signals/messages for incoming calls), which are used to establish and maintain communication with another party or destination. The controller/processor 310 may support various functions of the mobile terminal 100.

A mobile terminal 100 including a two-way display according to embodiments of the present invention will now be further described with reference to the schematic illustrations of FIGS. 2A and 2B. As shown in FIG. 2B, the flip member 115 has a first or closed orientation in which the flip member 115 is positioned adjacent the portable housing 110. As shown in FIG. 2A, the flip member 115 has a second or open orientation in which the flip member 115 is positioned away from the portable housing 110. Thus, with the transmissive display 125 positioned in the flip member 115, the transmissive display 125 is viewed looking at an inner side of the display relative to the portable housing in the open orientation and viewed through an outer side of the transmissive display relative to the portable housing in the closed position shown in FIG. 2B.

Also shown in FIG. 2A is a sensor 150 that detects the orientation of the flip member 115. A variety of different sensor devices may be used as the sensor 115 in accordance with embodiments of the present invention. For example, an electronic or optical sensor device may be used having an emitter (light source) and detector respectively in the portable housing 110 and the flip member 115 or an emitter and detector in one of the portable housing 110 and the flip member 115 and a reflective surface positioned appropriately in the corresponding other of the flip member 115 and portable housing 110. Alternatively, other types of detectors may be utilized including proximity sensors and mechanical switches and sensor means for detecting the position of the flip member 115 relative to the portable housing 110.

Embodiments of the present invention will now be further described with reference to the schematic block diagram illustration of FIG. 3. As illustrated in the embodiments of FIG. 3, the mobile terminal 300 includes a processor 310, a sensor circuit 320 and a transmissive display 330. The mobile terminal 300 further includes a communication circuit 370 coupled to an antenna 360. The processor 310 modifies a format of characters displayed on the transmissive display 330 responsive to the orientation of the transmissive display 330. The sensor circuit 320 detects the orientation of the transmissive display 330. The communication circuit 370 in cooperation with the antenna 360 may provide support for various aspects of wireless communications as will be understood by those of skill in the art. Such communication related aspects of the communication circuit 370 will, therefore, not be further described herein.

The transmissive display 330 may be a liquid crystal display. In further embodiments of the present invention, the transmissive display 330 may be a light emitting diode (LED) display mounted on a transmissive substrate. The transmissive display 330 may also be a color display. The color display may be provided, for example, by the use of a color tinted liquid crystal material for a liquid crystal display, in which all pixels are tinted one color to provide a single color display or different colors to provide for a multicolor display. For example, three different colors of pixel elements (such as red, green and blue) may be used in the transmissive display 330 and adjacent sets of pixels may include each of the three different colors. Alternatively, a conventional color liquid crystal display with color filters may be utilized. To provide a color display in both orientations, one ore color filters may be provided both on the front (outer) side of the transmissive display to define a color of the display in the first orientation and on a back (inner) side of the transmissive display to define a color of the display in a second orientation. Thus, even with the use of the appropriate color filters, the display may be transmissive and viewable from both sides. In various embodiments of the present invention, back lighting may also be provided for one or both orientations of the display.

The processor 310 may be configured to modify the format of characters displayed on the transmissive display 330 by a rotation of about 180° about a first axis when a transmissive display moves between the first and second orientation. The processor 310 may further be configured to modify the format of characters displayed in the transmissive display 330 by a rotation of about 180° about a second axis, orthogonal to the first axis, when the transmissive display moves between a first and second orientation. Such embodiments are illustrated with reference to FIGS. 2a and 2B. Note that by rotation of the displayed characters about one axis, the flip member 115 is moved between the positions shown in FIG. 2A and FIG. 2B and the characters are displayed so as to provide a user the same viewing prospective in both orientations. A further rotation about a second, orthogonal axis further allows the orientation of the phone to be rotated, when the flip is moved, while maintaining the same viewing perspective. Thus, a conventional display of characters from left to right and bottom to top on the display as viewed by a user may be maintained in both orientations. A similar modification may be provided for characters other than text, such as graphical characters, in accordance with the present invention. Furthermore, the particular modification of the display as shown with reference to FIGS. 2A and 2B may be changed in accordance with the present invention to provide the desired display perspective in the first and second orientations of the display as suited to particular applications including a two-way display.

Figure 4:
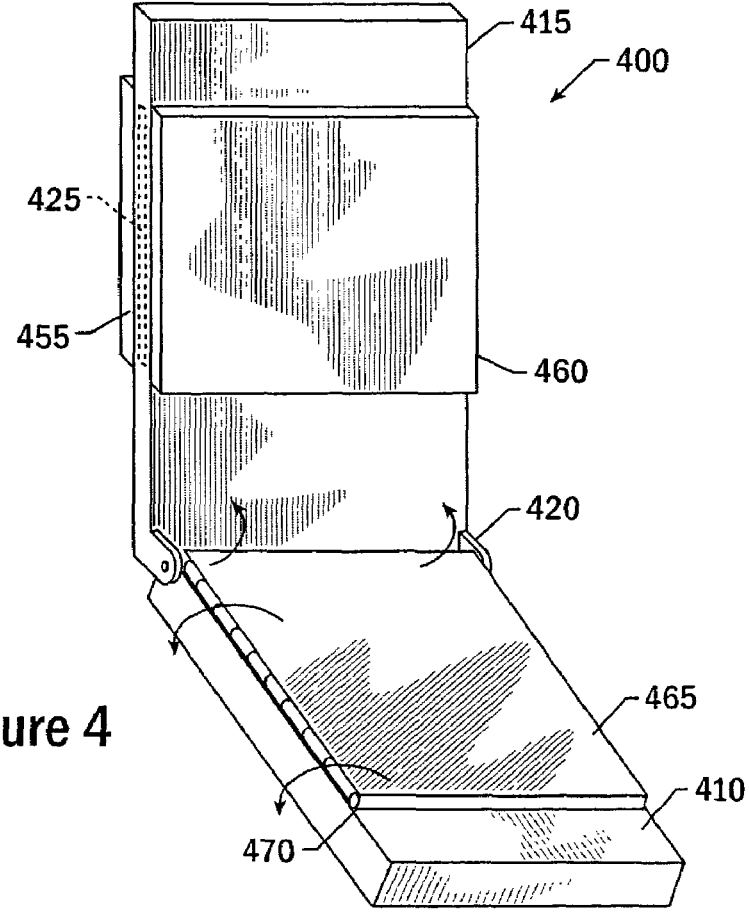
FIG. 4 is a perspective view illustrating a mobile terminal according to embodiments of the present invention.

Further embodiments of the present invention will now be described with reference to the perspective view illustration of FIG. 4. As shown in FIG. 4, a mobile terminal 400 according to embodiments of the present invention includes a portable housing 410 and a flip member 415 rotatably coupled by a hinge 420 or other coupling means allowing movement of the flip member 415 relative to the portable housing 410. A transmissive display 425 is positioned in the flip member 415.

A protective window 455 is positioned on a front face of the transmissive display 425 to provide protection for the display in both the closed and open position of the flip member 415. For the embodiments illustrated in FIG. 4, a protective window 460 is also positioned on a back face of the transmissive display 425 to further protect the transmissive display 425.

Also shown in the embodiments illustrated in FIG. 4 is a reflector 465 positioned between the flip member 415 and the portable housing 410 so as to be positioned adjacent the transmissive display 425 when the flip member 415 is in the closed position. The reflector 465 may facilitate viewing of the transmissive display 425 in a reflective mode when the flip member 415 is in the closed position. Other aspects of the mobile terminal 400, such as a keypad, may be positioned on the face of the portable housing 410. Accordingly, the reflector 465, as illustrated in FIG. 4, is movable away from the adjacent face of the portable housing 410. In particular, as shown in FIG. 4, the reflector 465 is rotatably connected to the portable housing 410 by a hinge 470 or other connection means allowing movement of the reflector 465 away from the face of the portable housing 410. It is to be understood that the reflector 465 may, alternatively, be moveable by rotation in a different direction or by being disconnected from the housing 410. In addition, the reflector 465 may be designed so as to be integral with the keypad or other features present on the face of the portable housing 410 so that operation thereof may be provided without providing a removable reflector 465. Furthermore, it is to be understood that the reflector 465 may be similarly associated with an inner face of the flip member 415 rather than positioned with reference to the portable housing 410.

The foregoing components of the mobile terminal 100, 300, 400, other than the transmissive display 125, 330, 425, may be included in many conventional mobile terminals and their functionality is generally known to those skilled in the art. It should be further understood, that, as used herein, the term "mobile terminal" may include a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/ intranet access, Web browser, organizer, calendar and/or a global positioning system (GPS) receiver; and a conventional laptop and/or palmtop portable computer, that may include a radiotelephone transceiver, or other portable device using a display.

Although the present invention may be embodied in communication devices or systems, such as the mobile terminal 100, 300, 400, the present invention is not limited to Such devices and/or systems. Instead, the present invention may be embodied in any apparatus that utilizes a display.

Figure 5:
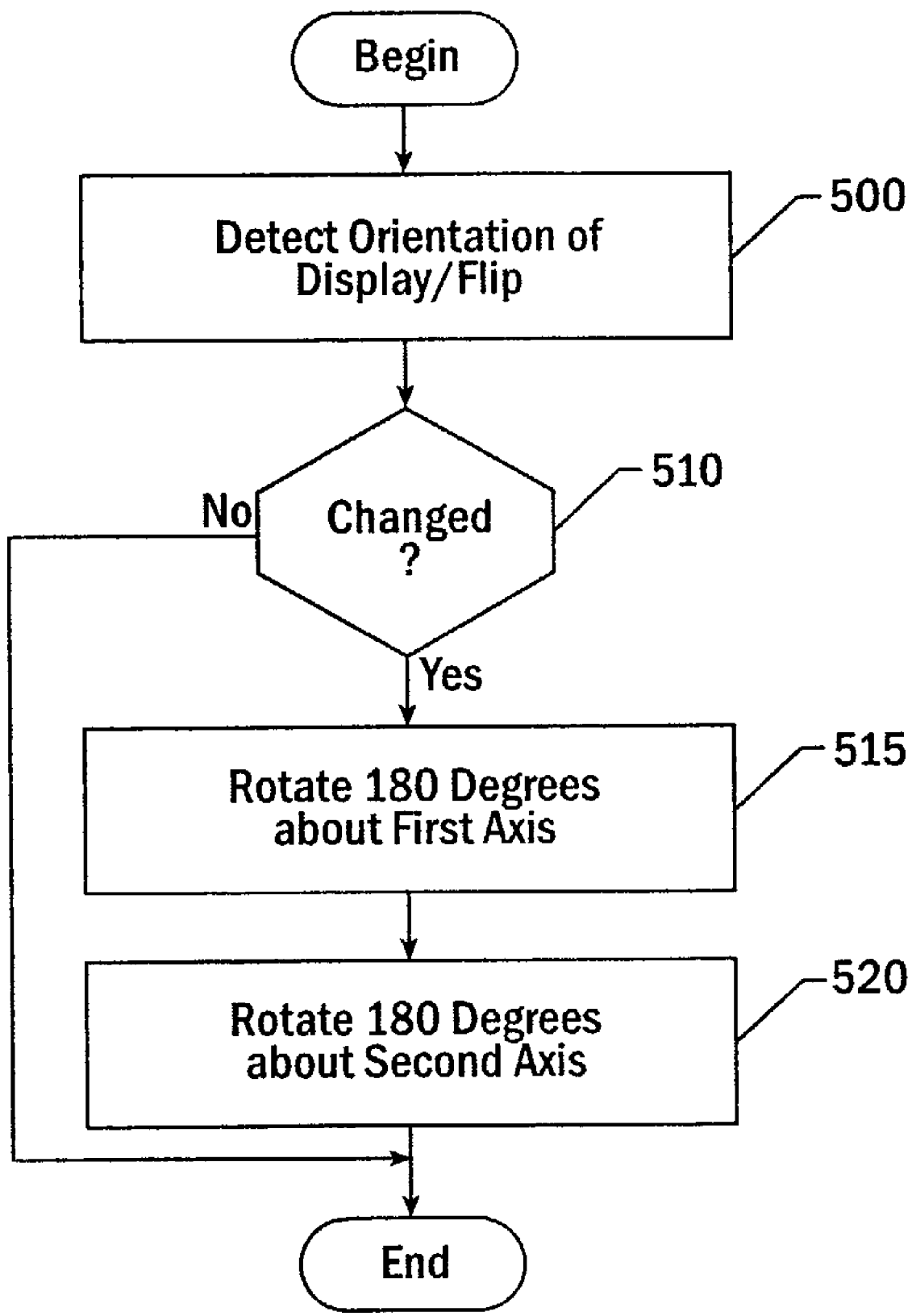
FIG. 5 is a flow chart illustrating operating a two-way display according to embodiments of the present invention.

FIG. 5 is a flow chart illustration of methods for operating a two-way display according to embodiments of the present invention. As illustrated in the flow chart of FIG. 5, operations begin at Block 500 with detecting an orientation of a transmissive display, such as a display positioned in the flip member of a mobile terminal. If the orientation of the display has not changed (Block 510), then modification operations as described for Block 515 and Block 520 are bypassed. However, if the orientation of the display has changed (Block 510) a format of characters displayed on a transmissive display are modified responsive to the orientation of the transmissive display. Operations for modifying the characters according to particular embodiments will now be described with reference to Block 515 and Block 520. As illustrated in FIG. 5, modification operations include rotating the characters about 180° about a first axis (Block 515) and further rotating the characters about 180° about a second axis, orthogonal to the first axis, which second axis may be the z-axis extending into the page with reference to FIG. 2B (Block 520). Modification operations of the sort described with reference to Block 515 and Block 520 may be particularly beneficial in applications, such as a flip member of a mobile terminal, where it is desired to utilize the two-way display to provide a user substantially the same prospective view of the display when viewed through either the front or back face of the transmissive display.

As described above, in applications such as a flip member of a mobile terminal, the two-way display of the present invention may provide a single display viewed on the inside of the flip, when the flip member is open, and viewed on the outside of the flip, when the flip member is closed. A transmissive display, such as a liquid crystal display, can thereby allow viewing from both sides responsive to detection of the position of the flip member in combination with appropriate processor operations (either software and/or hardware based) to reorient the display responsive to the position of the flip member. Thus, a single display utilizing a single driver may be utilized to provide two different display positions.

The flowcharts, flow diagrams and block diagrams of FIGS. 3 and 5 illustrate the architecture, functionality, and operation of possible implementations of methods for operating two-way displays. In this regard, each block in the flow charts or block diagrams may represent a module, segment, or portion of code, which comprises one or more executable instructions for implementing the specified logical act(s). It should also be noted that, in some alternative implementations, the acts noted in the blocks may occur out of the order noted in the figures. For example, two blocks shown in succession may, in fact, be executed substantially concurrently, or the blocks may be executed in the reverse order, depending upon the functionality involved.

The foregoing is illustrative of the present invention and is not to be construed as limiting thereof. Although a few exemplary embodiments of this invention have been described, those skilled in the art will readily appreciate that That which is claimed is:

1. A two-way display, comprising:
   a transmissive display having a first orientation and a second orientation;
   at least one color filter on a front side of the transmissive display to define a color of the transmissive display in the first orientation and at least one color filter on a back side of the transmissive display to define a color of the transmissive display in the second orientation;
   a reflector positioned adjacent the transmissive display in the first orientation but not in the second orientation so that the display is viewable in a reflective mode in the first orientation;
   a sensor that detects an orientation of the transmissive display; and
   a processor that modifies orientation of characters displayed on the transmissive display responsive to the orientation of the transmissive display, wherein the processor is configured to modify the format of characters displayed on the transmissive display by a rotation of about 180° about a first axis and by a rotation of about 180° about a second axis, orthogonal to the first axis, when the transmissive display moves between the first and second orientation.

2. The display of claim 1 wherein the transmissive display comprises at least one of a liquid crystal display or a light emitting diode (LED) display.

3. The display of claim 2 further comprising a protective window on a front face of the transmissive display.

4. The display of claim 3 further comprising a protective window on a back face of the transmissive display.

5. The display of claim 1 wherein the transmissive display includes pixel elements of a plurality of different colors.

6. The display of claim 5 wherein the transmissive display includes three different colors of pixel elements and wherein adjacent sets of pixels include each of the three different colors.

7. A mobile terminal, comprising:
   a portable housing;
   a flip member rotatably connected to the portable housing having a first orientation in which the flip member is positioned adjacent the portable housing and a second orientation in which the flip member is positioned away from the housing;
   a transmissive display positioned in the flip member;
   a reflector positioned between the transmissive display and the portable housing in the first orientation but not in the second orientation, wherein the reflector makes the transmissive display viewable in a reflective mode in the first orientation and wherein the reflector is movably coupled to the portable housing or the flip-member and configured to be movable to a position between the transmissive display and the portable housing when the flip member is in the first orientation;
   a sensor that detects the orientation of the flip member; and
   a processor that modifies a format of characters displayed on the transmissive display responsive to the orientation of the flip member.

8. The mobile terminal of claim 7 wherein the transmissive display comprises at least one of a liquid crystal display or a light emitting diode (LED) display.

9. The mobile terminal of claim 8 wherein the processor is configured to modify the format of characters displayed on the transmissive display by a rotation of about 180° about a first axis when the flip member moves between the first and second orientation.

10. The mobile terminal of claim 9 wherein the processor is further configured to modify the format of characters displayed on the transmissive display by a rotation of about 180° about a second axis, orthogonal to the first axis, when the flip member moves between the first and second orientation.

11. The mobile terminal of claim 8 further comprising a protective window on a front face of the transmissive display.

12. The mobile terminal of claim 11 further comprising a protective window on a back face of the transmissive display.

13. The mobile terminal of claim 8 wherein the transmissive display comprises a color display.

14. The mobile terminal of claim 13 wherein the color display includes at least one color filter on an outer side of the transmissive display relative to the portable housing to define a color of the transmissive display in the first orientation and at least one color filter on an opposite inner side of the transmissive display to define a color of the transmissive display in the second orientation.

15. The mobile terminal of claim 8 wherein the mobile terminal further comprises a communication circuit positioned in the portable housing and the mobile terminal comprises a radiotelephone.

16. The mobile terminal of claim 8 wherein the reflector is movably coupled to the portable housing.

17. The mobile terminal of claim 16 wherein the reflector is rotatably connected to the portable housing.

18. The mobile terminal of claim 8 wherein the reflector is movably coupled to the flip member.

19. The mobile terminal of claim 18 wherein the reflector is rotatably connected to the flip member.

* * * * *